(12) United States Patent
Asai

(10) Patent No.: US 7,157,074 B2
(45) Date of Patent: Jan. 2, 2007

(54) FINE ZIRCONIUM OXIDE POWDER AND METHOD FOR PRODUCING SAME

(75) Inventor: Kentaro Asai, Honjo (JP)

(73) Assignee: Dowa Mining Co., Ltd. (JP)

( * ) Notice: Subject to any disclaimer, the term of this patent is extended or adjusted under 35 U.S.C. 154(b) by 189 days.

(21) Appl. No.: 10/911,339

(22) Filed: Aug. 4, 2004

(65) Prior Publication Data

US 2005/0031534 A1 Feb. 10, 2005

(30) Foreign Application Priority Data

Aug. 5, 2003 (JP) ............................. 2003-205903

(51) Int. Cl.
*C01G 25/00* (2006.01)

(52) U.S. Cl. ........................... 423/608; 423/69; 423/85

(58) Field of Classification Search ................ 423/608, 423/69, 85
See application file for complete search history.

(56) References Cited

U.S. PATENT DOCUMENTS 5,990,373 A * 11/1999 Klabunde ................... 588/313
6,068,828 A * 5/2000 Hata et al. .................. 423/608
6,524,548 B1 * 2/2003 Mangold et al. ............ 423/608
6,982,073 B1 * 1/2006 Sabacky et al. ............ 423/608
2005/0118095 A1 * 6/2005 Kim et al. .................. 423/608

FOREIGN PATENT DOCUMENTS

JP 11-35323 2/1999

* cited by examiner

*Primary Examiner*—Timothy C. Vanoy
(74) *Attorney, Agent, or Firm*—Bachman & LaPointe

(57) ABSTRACT

There are provided a method for producing a fine zirconium oxide powder which has a narrower particle size distribution than that of conventional zirconium oxide powders and which is capable of lowering the starting temperature in the sintering reaction of a reactant to which the fine zirconium oxide powder is added. When a hydrated zirconium is calcined to be dispersed in a solvent with a dispersing agent, an alcohol (e.g., IPA or t-butanol) having a branched chain structure, not a straight chain structure, is used as the solvent, and a dicarboxylic acid (e.g., maleic acid or oxalic acid) having two carboxyl groups in its molecule is used as the dispersing agent. Thus, a fine zirconium oxide powder having a narrow particle size distribution and a small particle size at 90 vol % is obtained.

7 Claims, 2 Drawing Sheets

FINE ZIRCONIUM OXIDE POWDER AND METHOD FOR PRODUCING SAME

BACKGROUND OF THE INVENTION

1. Field of the Invention

The present invention generally relates to a fine zirconium oxide powder and a method for producing the same. More specifically, the invention relates to a fine zirconium oxide powder used as an additive to electronic parts, and a method for producing the same.

2. Description of the Prior Art

In conventional electronic parts such as capacitors, zirconium is used as an element for shifting the Curie point. Zirconium is added mainly as zirconium oxide when raw materials are mixed with each other, and then, sintered by a solid phase reaction in a sintering process. A fine zirconium oxide powder used for such a purpose is obtained by calcining a hydrated zirconium, which is obtained by a hydrolysis or neutralization reaction from an aqueous zirconium solution, after or without drying the hydrated zirconium, and thereafter, by causing the calcined powder to be dispersed in water serving as a solvent to be dried and ground.

For example, there is known a method comprising the steps of: mixing a zirconium powder material having a mean particle size of 0.8 µm or more in a solvent of one or more kinds selected from the group consisting of water, alcohols, aromatic hydrocarbons, esters and Cellosolves (trade name, commercially available from Union Carbide Corp.), to prepare a slurry; adding an organic acid, a polyelectrolyte, a surface active agent or the like to the slurry as a dispersing agent; and grinding the slurry by means of a grinder (see Japanese Patent Laid-Open No. 11-35323). Furthermore, at the dispersing step, there are some cases where a solvent other than water is used in order to enhance dispersibility, and alcohols, ketones and aromatic hydrocarbons are often used.

However, if the solvent and dispersing agent disclosed in Japanese Patent Laid-Open No. 11-35323 are used, the particle size distribution is widened during dispersion. If such a fine zirconium oxide powder having a large particle size and a wide particle size distribution is used as the additive, there is a problem in that the starting temperature in the sintering reaction of a reactant, to which the fine zirconium oxide powder is added, is raised.

SUMMARY OF THE INVENTION

It is therefore an object of the present invention to eliminate the aforementioned problems and to provide a fine zirconium oxide powder, which has a narrower particle size distribution than that of conventional zirconium oxide powders and which is capable of lowering the starting temperature in the sintering reaction of a reactant to which the fine zirconium oxide powder is added, and a method for producing the same.

In order to accomplish the aforementioned and other objects, the inventors have diligently studied and found that it is possible to produce a fine zirconium oxide powder, which has a narrow particle size distribution and which is capable of lowering the starting temperature in the sintering reaction of a reactant to which the fine zirconium oxide power is added, by using an alcohol having a branched chain structure as a solvent and using a carboxylic acid having two carboxyl groups or more in its molecule as a dispersing agent, at a dispersing step when producing the fine zirconium oxide powder by drying and grinding a calcined powder, which is obtained by calcining a hydrated zirconium obtained from an aqueous zirconium solution, after adding the solvent and dispersing agent to the calcined powder to disperse the calcine powder in the solvent. Thus, the inventors have made the present invention.

According to one aspect of the present invention, there is provided a method for producing a fine zirconium oxide powder comprising the steps of: preparing a hydrated zirconium from an aqueous zirconium solution; calcining the hydrated zirconium to form a calcined powder; adding a solvent and a dispersing agent to the calcined powder to disperse the calcined powder in the solvent; and drying and grinding the calcined powder dispersed in the solvent, to produce a fine zirconium oxide powder, wherein the solvent is an alcohol having a branched chain structure, and the dispersing agent is a carboxylic acid having two carboxyl groups or more in its molecule.

In this method for producing a fine zirconium oxide powder, the amount of the carboxylic acid is preferably 5 wt % or less. The mean particle size of the fine zirconium oxide powder is preferably 0.2 µm or less, and the particle size at 90 vol % thereof is preferably 0.3 µm or less. The bulk density of the fine zirconium oxide powder is preferably in the range of from 0.3 to 0.6 $g/cm^3$. The alcohol is preferably 2-propanol or t-butanol, and the carboxylic acid is preferably a dicarboxylic acid, such as maleic acid or oxalic acid.

According to another aspect of the present invention, there is provided a fine zirconium oxide powder having a mean particle size of 0.2 µm or less, and a particle size at 90 vol % of 0.3 µm or less. The bulk density of the fine zirconium oxide powder is preferably in the range of from 0.3 to 0.6 $g/cm^3$.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Figure 1:
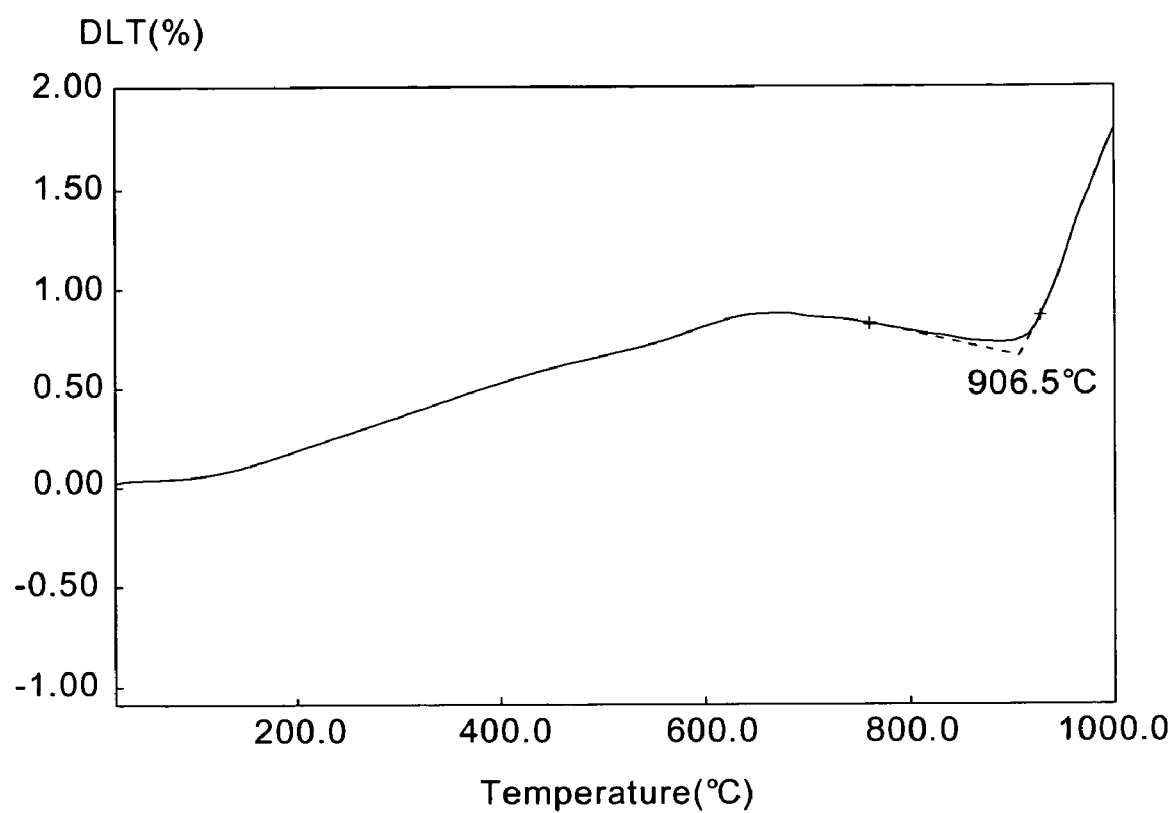
FIG. 1 is a graph showing the sintering characteristic of a fine zirconium oxide powder obtained in Example 1.

In a preferred embodiment of a method for producing a fine zirconium oxide powder according to the present invention, when a hydrated zirconium is calcined to be dispersed in a solvent with a dispersing agent, an alcohol (e.g., IPA or t-butanol) having a branched chain structure, not a straight chain structure, is used as the solvent, and a dicarboxylic acid (e.g., maleic acid or oxalic acid) having two carboxyl groups or more in its molecule is used as the dispersing agent, so that it is possible to obtain a fine zirconium oxide powder having a narrow particle size distribution and a small particle size at 90 vol %.

Furthermore, throughout the specification, the term "particle size" means a particle size measured by the laser diffraction or scattering method, and the term "particle size at 90 vol %" means a particle size when a cumulative volume percentage from the minimum particle size measured by the laser diffraction or scattering method is 90 vol %. In addition, throughout the specification, the "mean particle size" and "particle size at 90 vol %" are measured by the laser diffraction or scattering method when powder is suspended in a solvent such as water. Moreover, the "bulk density" is a value measured by a bulk density measuring device described in JIS K5101.

Examples of a fine zirconium oxide powder and a method for producing the same according to the present invention will be described below in detail.

EXAMPLE 1

Such an amount of ion exchange water that the amount of zirconium oxide was 50 g/L at a reaction end time was heated to 60° C., and one mole of hydrogen peroxide per one mole of zirconium oxide was added to the ion exchange water to prepare an aqueous solution. To this aqueous solution, an aqueous zirconium oxychloride solution of 300 g/L as converted to zirconium oxide, and aqueous ammonia were added so that pH was a constant value of 5, and reacted with each other. Then, after an aqueous zirconium oxychloride solution was added thereto so that the amount of the aqueous zirconium oxychloride solution corresponded to a reaction amount, aqueous ammonia was added to cause pH to rise to 7. Then, this solution was dehydrated, and an aqueous solution containing 0.05 moles of aqueous ammonia was caused to pass through the dehydrated substance so that the amount of the aqueous solution was 300 L/kg as converted to zirconium oxide.

After the cake thus obtained was dried at 150° C. for 24 hours by means of a forced-air type stationary drier, the dry powder thus obtained was ground and calcined at 730° C. for 7 hours. This calcined powder was ground by means of a zirconia ball having a diameter of 0.2 mm, using 2-propanol as a solvent so as to provide a pulp density of 20 wt %, and adding 2 wt % of maleic acid thereto. After the slurry thus ground was dried at 120° C. for 12 hours by means of a vacuum drier, the dried slurry was ground to obtain a fine zirconium oxide powder.

After the bulk density of the fine zirconium oxide powder thus obtained was measured, the bulk density was 0.53 g/cm$^3$. After the fine zirconium oxide powder thus obtained was ultrasonically dispersed in 0.2 wt % of hexametaphosphoric acid solution as a solvent, the mean particle size and the particle size at 90 vol % were measured by means of a microtrack HRA particle size distribution meter. As a result, the mean particle size was 0.12 μm, and the particle size at 90 vol % was 0.19 μm.

In order to examine the sintering characteristics of the fine zirconium oxide powder obtained, a powder was prepared by mixing 99 wt % of barium carbonate (commercially available) with titanium oxide in a mortar so that the molar ratio of barium to titanium is one to one, and 10 wt % of the fine zirconium oxide powder obtained was added to the prepared powder to be mixed therewith in the mortar. The mixed powder was molded at a pressure of 250 g/cm$^2$, and the coefficient of thermal expansion of the molded article was measured by a thermal expansion measuring device (Diratometer 5010 produced by Mac Science Corp.) while the temperature is raised at a rate of 10° C. per minute from a room temperature to 1000° C. As a result, as shown in FIG. 1, the coefficient of thermal expansion (DLT %) showed a tendency to gently increase as the temperature rises to about 650° C., and then, to slightly decreases, and thereafter, to abruptly increase so as to have a point of inflection after exceeding 900° C. Before and after this point of inflection, tangential lines are drawn on the curve of the coefficient of thermal expansion with respect to temperature, and it is assumed that a temperature at which the tangential lines cross each other is a reaction starting temperature. Then, the reaction starting temperature was 906.5° C., and the coefficient of expansion at 1000° C. was 1.2%. Furthermore, if zirconium oxide is not added, barium carbonate and titanium oxide start to shrink at about 950° C., and the coefficient of expansion at 1000° C. is −1.5%.

EXAMPLE 2

A fine zirconium oxide powder was obtained by the same method as that in Example 1, except that oxalic acid was substituted for maleic acid. With respect to the fine zirconium oxide powder thus obtained, the bulk density, the mean particle size, the particle size at 90 vol %, the reaction starting temperature and the coefficient of expansion at 1000° C. were measured by the same method as that in Example 1. As a result, the bulk density was 0.54 g/cm$^3$, the mean particle size was 0.12 μm, and the particle size at 90 vol % was 0.21 μm. In addition, the reaction starting temperature was 906° C., and the coefficient of expansion at 1000° C. was 1.15%.

EXAMPLE 3

A fine zirconium oxide powder was obtained by the same method as that in Example 1, except that t-butanol was substituted for 2-propanol and that the amount of maleic acid to be added was 0.2 wt %. With respect to the fine zirconium oxide powder thus obtained, the bulk density, the mean particle size, and the particle size at 90 vol % were measured by the same method as that in Example 1. As a result, the bulk density was 0.53 g/cm$^3$, the mean particle size was 0.12 μm, and the particle size at 90 vol % was 0.24 μm.

EXAMPLE 4

A fine zirconium oxide powder was obtained by the same method as that in Example 1, except that t-butanol was substituted for 2-propanol. With respect to the fine zirconium oxide powder thus obtained, the bulk density, the mean particle size, the particle size at 90 vol %, the reaction starting temperature and the coefficient of expansion at 1000° C. were measured by the same method as that in Example 1. As a result, the bulk density was 0.55 g/cm$^3$, the mean particle size was 0.13 μm, and the particle size at 90 vol % was 0.22 μm. In addition, the reaction starting temperature was 888° C., and the coefficient of expansion at 1000° C. was 0.8%. Thus, the reaction starting temperature was low.

EXAMPLE 5

A fine zirconium oxide powder was obtained by the same method as that in Example 1, except that t-butanol was substituted for 2-propanol and that the amount of maleic acid to be added was 5 wt %. With respect to the fine zirconium oxide powder thus obtained, the bulk density, the mean particle size, and the particle size at 90 vol % were measured by the same method as that in Example 1. As a result, the bulk density was 0.59 g/cm$^3$, the mean particle size was 0.13 μm, and the particle size at 90 vol % was 0.22 μm.

EXAMPLE 6

A fine zirconium oxide powder was obtained by the same method as that in Example 1, except that t-butanol was substituted for 2-propanol and that oxalic acid was substituted for maleic acid. With respect to the fine zirconium oxide powder thus obtained, the bulk density, the mean particle size, the particle size at 90 vol %, the reaction starting temperature and the coefficient of expansion at 1000° C. were measured by the same method as that in Example 1. As a result, the bulk density was 0.54 g/cm$^3$, the mean particle size was 0.15 µm, and the particle size at 90 vol % was 0.24 µm. In addition, the reaction starting temperature was 889° C., and the coefficient of expansion at 1000° C. was 3.2%. Thus, the reaction starting temperature was low.

COMPARATIVE EXAMPLE 1

Figure 2:
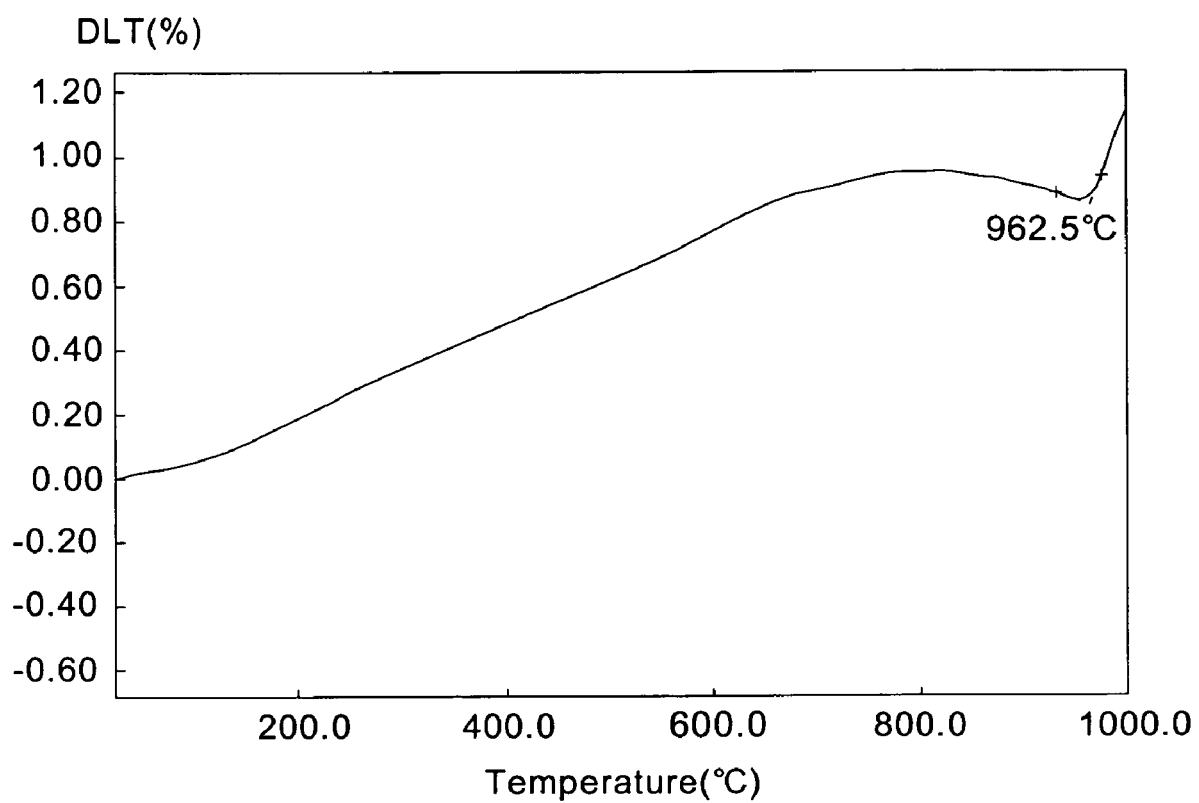
FIG. 2 is a graph showing the sintering characteristic of a fine zirconium oxide powder obtained in Comparative Example 1.

A zirconium oxide powder was obtained by the same method as that in Example 1, except that water was substituted for 2-propanol and that grinding was carried out without adding any additive. With respect to the zirconium oxide powder thus obtained, the bulk density, the mean particle size, the particle size at 90 vol %, the reaction starting temperature and the coefficient of expansion at 1000° C. were measured by the same method as that in Example 1. As a result, the bulk density was 0.68 g/cm$^3$, the mean particle size was 0.35 µm, and the particle size at 90 vol % was 1.1 µm. In addition, the reaction starting temperature was 962.5° C., and the coefficient of expansion at 1000° C. was 1.2%. Thus, the mean particle size and the particle size at 90 vol % were large, and the reaction starting temperature was high. Furthermore, the sintering characteristic of the zirconium oxide powder obtained in this comparative example is shown in FIG. 2.

COMPARATIVE EXAMPLE 2

A zirconium oxide powder was obtained by the same method as that in Example 1, except that grinding was carried out without adding any additive. With respect to the zirconium oxide powder thus obtained, the bulk density, the mean particle size, the particle size at 90 vol %, the reaction starting temperature and the coefficient of expansion at 1000° C. were measured by the same method as that in Example 1. As a result, the bulk density was 0.5 g/cm$^3$, the mean particle size was 0.33 µm, and the particle size at 90 vol % was 1.3 µm. In addition, the reaction starting temperature was 920° C., and the coefficient of expansion at 1000° C. was 1.8%. Thus, the mean particle size and the particle size at 90 vol % were large, and the reaction starting temperature was high.

COMPARATIVE EXAMPLE 3

A fine zirconium oxide powder was obtained by the same method as that in Example 1, except that acetic acid was substituted for maleic acid. With respect to the fine zirconium oxide powder thus obtained, the bulk density, the mean particle size, the particle size at 90 vol %, the reaction starting temperature and the coefficient of expansion at 1000° C. were measured by the same method as that in Example 1. As a result, the bulk density was 0.61 g/cm$^3$, the mean particle size was 0.19 µm, and the particle size at 90 vol % was 11.11 µm. In addition, the reaction starting temperature was 910° C., and the coefficient of expansion at 1000° C. was 1%. Thus, the particle size at 90 vol % was very large.

COMPARATIVE EXAMPLE 4

A fine zirconium oxide powder was obtained by the same method as that in Example 1, except that benzoic acid was substituted for maleic acid. With respect to the fine zirconium oxide powder thus obtained, the bulk density, the mean particle size, the particle size at 90 vol %, the reaction starting temperature and the coefficient of expansion at 1000° C. were measured by the same method as that in Example 1. As a result, the bulk density was 0.59 g/cm$^3$, the mean particle size was 0.14 µm, and the particle size at 90 vol % was 3.57 µm. In addition, the reaction starting temperature was 911° C., and the coefficient of expansion at 1000° C. was 1.2%. Thus, the particle size at 90 vol % was very large.

COMPARATIVE EXAMPLE 5

A zirconium oxide powder was obtained by the same method as that in Example 1, except that t-butanol was substituted for 2-propanol and that grinding was carried out without adding any additive. With respect to the zirconium oxide powder thus obtained, the bulk density, the mean particle size, the particle size at 90 vol %, the reaction starting temperature and the coefficient of expansion at 1000° C. were measured by the same method as that in Example 1. As a result, the bulk density was 0.53 g/cm$^3$, the mean particle size was 0.13 µm, and the particle size at 90 vol % was 0.42 µm. In addition, the reaction starting temperature was 928° C., and the coefficient of expansion at 1000° C. was 2.6%. Thus, the particle size at 90 vol % was large, and the reaction starting temperature was high.

COMPARATIVE EXAMPLE 6

A fine zirconium oxide powder was obtained by the same method as that in Example 1, except that t-butanol was substituted for 2-propanol and that the amount of maleic acid to be added was 10 wt %. With respect to the fine zirconium oxide powder thus obtained, the bulk density, the mean particle size, and the particle size at 90 vol % were measured by the same method as that in Example 1. As a result, the bulk density was 0.62 g/cm$^3$, the mean particle size was 0.13 µm, and the particle size at 90 vol % was 0.21 µm. Thus, the bulk density was high.

COMPARATIVE EXAMPLE 7

A zirconium oxide powder was obtained by the same method as that in Example 1, except that ethanol was substituted for 2-propanol and that grinding was carried out without adding any additive. With respect to the zirconium oxide powder thus obtained, the bulk density, the mean particle size, the particle size at 90 vol %, the reaction starting temperature and the coefficient of expansion at 1000° C. were measured by the same method as that in Example 1. As a result, the bulk density was 0.58 g/cm$^3$, the mean particle size was 0.24 µm, and the particle size at 90 vol % was 2.56 µm. In addition, the reaction starting temperature was 926° C., and the coefficient of expansion at 1000° C. was 2.2%. Thus, the mean particle size and the particle size at 90 vol % were large, and the reaction starting temperature was high.

COMPARATIVE EXAMPLE 8

A fine zirconium oxide powder was obtained by the same method as that in Example 1, except that ethanol was substituted for 2-propanol. With respect to the fine zirconium oxide powder thus obtained, the bulk density, the mean particle size, the particle size at 90 vol %, the reaction starting temperature and the coefficient of expansion at 1000° C. were measured by the same method as that in Example 1. As a result, the bulk density was 0.57 g/cm$^3$, the mean particle size was 0.13 μm, and the particle size at 90 vol % was 0.72 μm. In addition, the reaction starting temperature was 920° C., and the coefficient of expansion at 1000° C. was 2.3%. Thus, the particle size at 90 vol % was large, and the reaction starting temperature was high.

COMPARATIVE EXAMPLE 9

A fine zirconium oxide powder was obtained by the same method as that in Example 1, except that ethanol was substituted for 2-propanol and that oxalic acid was substituted for maleic acid. With respect to the fine zirconium oxide powder thus obtained, the bulk density, the mean particle size, the particle size at 90 vol %, the reaction starting temperature and the coefficient of expansion at 1000° C. were measured by the same method as that in Example 1. As a result, the bulk density was 0.58 g/cm$^3$, the mean particle size was 0.1 μm, and the particle size at 90 vol % was 0.17 μm. In addition, the reaction starting temperature was 917° C., and the coefficient of expansion at 1000° C. was 2.4%. Thus, the reaction starting temperature was high.

Furthermore, the results of Examples 1 through 6 and Comparative Examples 1 through 9 are shown in Tables 1 through 4.

TABLE 1

| Ex. | Solvent | Structure of Solvent | Additive | Number of Carboxyl Groups | Added Amount (%) |
|---|---|---|---|---|---|
| 1 | 2-propanol | branched | maleic acid | 2 | 2 |
| 2 | 2-propanol | branched | oxalic acid | 2 | 2 |
| 3 | t-butanol | branched | maleic acid | 2 | 0.2 |
| 4 | t-butanol | branched | maleic acid | 2 | 2 |
| 5 | t-butanol | branched | maleic acid | 2 | 5 |
| 6 | t-butanol | branched | oxalic acid | 2 | 2 |

TABLE 2

| Ex. | Bulk Density (g/cm$^3$) | Mean Particle Size (μm) | Particle Size at 90 vol % (μm) | Sintering Starting Temperature (° C.) | Coefficient of Expansion (%) |
|---|---|---|---|---|---|
| 1 | 0.53 | 0.12 | 0.19 | 906.5 | 1.2 |
| 2 | 0.54 | 0.12 | 0.21 | 906 | 1.15 |
| 3 | 0.53 | 0.12 | 0.24 | — | — |
| 4 | 0.55 | 0.13 | 0.22 | 888 | 0.8 |
| 5 | 0.59 | 0.13 | 0.22 | — | — |
| 6 | 0.54 | 0.15 | 0.24 | 889 | 3.2 |

TABLE 3

| Comp. | Solvent | Structure of Solvent | Additive | Number of Carboxyl Groups | Added Amount (%) |
|---|---|---|---|---|---|
| 1 | water | — | — | 0 | 0 |
| 2 | 2-propanol | branched | — | 0 | 0 |
| 3 | 2-propanol | branched | acetic acid | 1 | 2 |
| 4 | 2-propanol | branched | benzoic acid | 1 | 2 |
| 5 | t-butanol | branched | — | 0 | 0 |
| 6 | t-butanol | branched | maleic acid | 2 | 10 |
| 7 | ethanol | straight chain | — | 0 | 0 |
| 8 | ethanol | straight chain | maleic acid | 2 | 2 |
| 9 | ethanol | straight chain | oxalic acid | 2 | 2 |

TABLE 4

| Comp. | Bulk Density (g/cm$^3$) | Mean Particle Size (μm) | Particle Size at 90 vol % (μm) | Sintering Starting Temperature (° C.) | Coefficient of Expansion (%) |
|---|---|---|---|---|---|
| 1 | 0.68 | 0.35 | 1.1 | 962.5 | 1.2 |
| 2 | 0.5 | 0.33 | 1.3 | 920 | 1.8 |
| 3 | 0.61 | 0.19 | 11.11 | 910 | 1 |
| 4 | 0.59 | 0.14 | 3.57 | 911 | 1.2 |
| 5 | 0.53 | 0.13 | 0.42 | 928 | 2.6 |
| 6 | 0.62 | 0.13 | 0.21 | — | — |
| 7 | 0.58 | 0.24 | 2.56 | 926 | 2.2 |
| 8 | 0.57 | 0.13 | 0.72 | 920 | 2.3 |
| 9 | 0.58 | 0.1 | 0.17 | 917 | 2.4 |

As described above, according to the present invention, it is possible to provide a fine zirconium oxide powder, which has a narrow particle size distribution and a small particle size at 90 vol %, by using an alcohol having a branched chain structure as a solvent while using a carboxylic acid having two carboxyl groups as a dispersing agent when a hydrated zirconium calcined is dispersed in the solvent with the dispersing agent, so that it is possible to start a sintering reaction at a lower temperature.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method for producing a fine zirconium oxide powder comprising the steps of:

preparing a hydrated zirconium from an aqueous zirconium solution;

calcining the hydrated zirconium to form a calcined powder;

adding a solvent and a dispersing agent to the calcined powder to disperse the calcined powder in the solvent; and drying and grinding the calcined powder dispersed in the solvent, to produce a fine zirconium oxide powder, wherein said solvent is an alcohol having a branched chain structure, and said dispersing agent is a carboxylic acid having at least two carboxyl groups in its molecule.

2. A method for producing a fine zirconium oxide powder as set forth in claim 1, wherein the amount of said carboxylic acid is no greater than 5 wt %.

3. A method for producing a fine zirconium oxide powder as set forth in claim 1, wherein said fine zirconium oxide powder has a mean particle size of no greater than 0.2 μm, and a particle size at 90 vol % of no greater than 0.3 μm.

4. A method for producing a fine zirconium oxide powder as set forth in claim 1, wherein said fine zirconium oxide powder has a bulk density of 0.3 to 0.6 g/cm$^3$.

5. A method for producing a fine zirconium oxide powder as set forth in claim 1, wherein said alcohol is 2-propanol or t-butanol.

6. A method for producing a fine zirconium oxide powder as set forth in claim 1, wherein said carboxylic acid is a dicarboxylic acid.

7. A method for producing a fine zirconium oxide powder as set forth in claim 6, wherein said dicarboxylic acid is maleic acid or oxalic acid.

* * * * *